Oct. 17, 1950   C. B. SMITH   2,526,510

DIRECTIONAL CONTROL OF PROPULSIVE JETS

Filed Nov. 5, 1947

INVENTOR
*Charles Branson Smith.*
BY
*Charles A. Warren*
ATTORNEY

Patented Oct. 17, 1950

2,526,510

UNITED STATES PATENT OFFICE 2,526,510

DIRECTIONAL CONTROL OF PROPULSIVE JETS

Charles Branson Smith, Portland, Conn., assignor to United Aircraft Corporation, East Hartford, Conn., a corporation of Delaware Application November 5, 1947, Serial No. 784,117

7 Claims. (Cl. 60—35.55)

This invention relates to a reaction nozzle, for example, of a reaction type missile, and particularly to an arrangement for controlling the direction of the jet discharge. It is intended, by so doing, to obtain a force for stabilizing and controlling the vehicle.

It is obvious that the directional discharge of fluid from a nozzle can be changed by changing the axis of the nozzle, and this arrangement is adequate where the nozzle can be readily movable. Under certain conditions, however, as for example, in aircraft or missiles, such an arrangement would be difficult, if not impossible, to incorporate and control. The principal feature of the invention is an arrangement for changing the direction of the jet discharge without rotating the nozzle body. This control is effected by displacing the walls of the exhaust so as to produce an oblique exit. Such an exit produces a deflected jet.

By this arrangement it is possible to reduce the drag and increase the low speed control effectiveness of an aircraft or missile in which nozzles of this type may be incorporated.

Other objects and advantages will be apparent from the specification and claims, and from the accompanying drawing which illustrates an embodiment of the invention.

Figure 1:
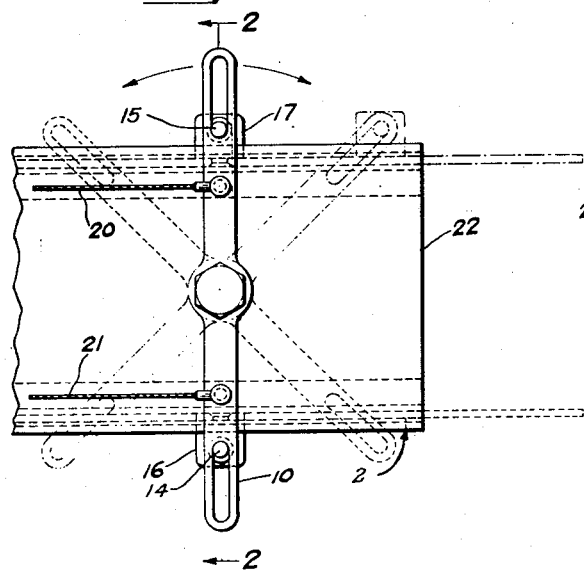
Fig. 1 is a side elevation of the thrust nozzle with oppositely movable walls.
Figure 2:
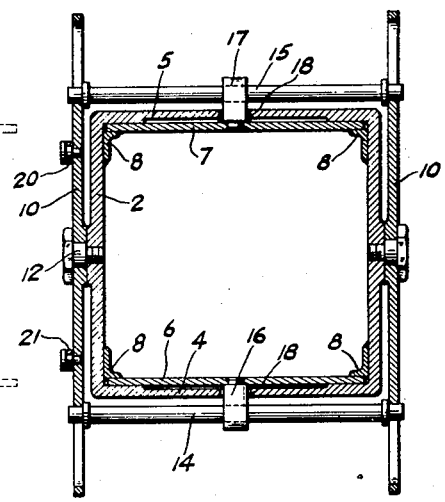
Fig. 2 is a sectional view substantially on line 2—2 of Fig. 1.

With reference first to Figs. 1 and 2, the nozzle exit which may be supplied with a supersonic flow of gas under pressure from any source consists at its discharge end of a rectilinear duct 2 having, on opposite walls 4 and 5, movable plates 6 and 7 supported as by guides 8 such that the plates may be shifted in a fore and aft direction parallel to the flow of gas within the duct. The opposed plates are preferably interconnected so that both plates will move simultaneously and in opposite directions, as, for example, by the levers 10 pivoted on studs 12 on the side walls of the duct and engaging with rods 14 and 15 supported by lugs 16 and 17 connected to the opposed plates 6 and 7 and extending through slots 18 in the duct. Control wires 20 and 21 connected to one lever 10 permit control of the axial position of the plates 6 and 7. Thus, a pull on the top wire 20 will move the upper plate 7 forwardly and the bottom plate 6 rearwardly with respect to the discharge opening 22 of the thrust nozzle so that the bottom plate is in the dotted position shown. Similarly, a pull on the bottom control cable 21 will move the upper plate 7 rearwardly into the dot-dash line position shown and will displace the lower plate 6 forwardly an equal amount.

It has been found that, when a jet discharges at a supersonic velocity and with a pressure less than the surrounding atmospheric pressure, the jet will discharge at an angle from the nozzle when the end of the nozzle is not at right angles to the gas flow with the displacement in the direction of the most rearward part of the discharge opening. Thus, by providing for moving the opposed plates in such a manner that the trailing edge of one wall of the duct is displaced axially from the opposite trailing edge, that is to say, that the trailing edge of plate 7 displaced rearwardly of plate 6 as in Fig. 3, the jet will be deflected in the direction of the plate 7 and will emerge from the nozzle at an angle to the flow within the nozzle as indicated by the arrows in this figure.

Figure 3:
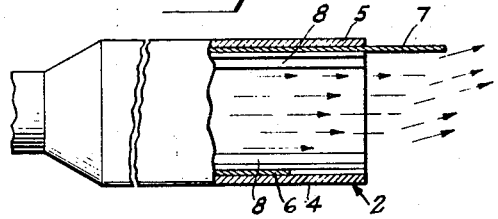
Fig. 3 is a schematic showing of the effect of rearwardly displacing the upper wall with respect to the lower in a supersonic nozzle.
Figure 4:
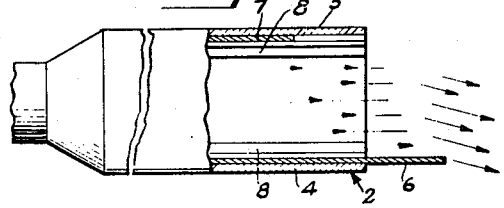
Fig. 4 is a showing similar to Fig. 3 with the bottom wall rearwardly displaced with respect to the top wall.

Instead of deflecting the jet upwardly as shown in Fig. 3, the jet may be deflected downwardly by shifting the relative positions of the trailing edges of the plates 6 and 7 so that the edge of the lower plate 6 is located rearwardly of the trailing edge of the upper plate 7 as in Fig. 4. When the plates are arranged in this way, the jet may be deflected toward the bottom plate as represented by the arrows in Fig. 4.

Figure 5:
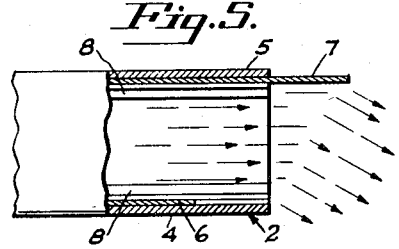
Figs. 5 and 6 are views similar to Figs. 3 and 4 but with the pressure in the nozzle greater than atmospheric.
Figure 6:
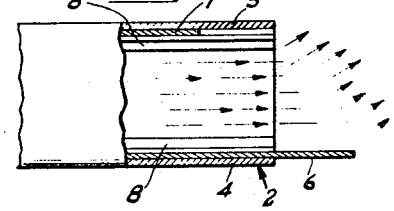

The invention is equally applicable where the pressure is greater than ambient rather than less as shown in Figs. 5 and 6. It will be apparent from these figures that the deflection of the jet is opposite to its deflection when the pressure correction is made through a shock, thus, when the trailing edge of the upper plate 7 is located rearwardly of the trailing edge of opposed plates 6, the jet will be directed downwardly as shown in Fig. 5. As the position of plates is reversed, the direction of the jet will be upwardly as in Fig. 6.

Figure 7:
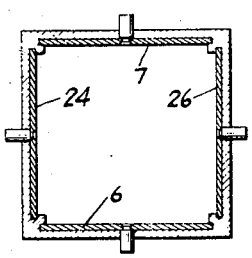
Fig. 7 is a view similar to Fig. 2 showing the modification.

An arrangement of this type permits the control of the direction of the jet by adjusting the position of the nozzle opening with respect to the direction of flow of the fluid through the nozzle without the necessity for changing the angle of the nozzle itself. In the arrangement described, only the top and bottom plates are shown as movable in the nozzle so that the deflection of the jet would be vertically. It will be understood that the nozzle may be arranged for movement of more parts of the trailing edge of the nozzle as, for example, in Fig. 7 in which the top and bottom plates 7 and 6 are movable, as above, and the nozzle is also provided with movable side plates 24 and 26 controlled by a mechanism similar to that shown in Figs. 1 and 2, with this arrangement in addition to vertical deflection of the jet, the latter may be deflected laterally by axial movement of either or both of the plates 24 and 26.

It is to be understood that the invention is not limited to the specific embodiment herein illustrated and described, but may be used in other ways without departure from its spirit as defined by the following claims.

I claim:

1. A thrust nozzle for the discharge of fluid therethrough as a propulsive jet, including opposed walls with trailing edges forming the discharge end of the nozzle and means for axially displacing one or more of said walls with respect to the others.

2. A thrust nozzle for the discharge of fluid therethrough as a propulsive jet, including a series of walls forming elements extending axially and having their trailing edges forming the discharge opening of the nozzle and means for moving at least one of said elements axially relative to the others for adjusting the general plane of the discharge opening relative to the axis of the nozzle.

3. A thrust nozzle for the discharge of fluid therethrough as a propulsive jet, including a series of walls forming elements extending axially and having their trailing edges forming the discharge opening of the nozzle and means for moving any one of said elements axially with respect to the others to extend it beyond the general plane of the discharge opening.

4. A thrust nozzle for the discharge of fluid therethrough as a propulsive jet, including a series of walls forming elements extending axially and having their trailing edges forming the discharge opening of the nozzle, at least one of said elements being axially adjustable to move the trailing edge thereof forwardly or rearwardly of the general plane of the discharge opening.

5. In a thrust nozzle, means for controlling the direction of fluid discharge including axially adjustable walls, the trailing edges of which form a part at least of the discharge opening, and means for moving at least one of said walls axially to position the trailing edge thereof selectively forwardly or rearwardly of the general plane of the discharge opening.

6. In a thrust nozzle, means for controlling the direction of fluid discharge, including opposed axially movable walls, the trailing edges of which form the opposite edges of the discharge opening and means for interconnecting said opposed walls to cause movement of said walls in opposite directions axially of the nozzle for positioning the trailing edges thereof relatively forwardly and rearwardly of the general plane of the discharge opening.

7. A thrust nozzle including walls forming a nozzle passage through which fluid flows as a propulsive jet and means for adjusting a part of the walls axially relative to the axis of the nozzle passage thereby positioning the trailing edge of said part of the walls axially beyond the trailing edges of the rest of the walls.

CHARLES BRANSON SMITH.

REFERENCES CITED

The following references are of record in the file of this patent:

UNITED STATES PATENTS

| Number | Name | Date |
|---|---|---|
| 1,353,955 | Hering | Sept. 28, 1920 |
| 1,879,187 | Goddard | Sept. 27, 1932 |

FOREIGN PATENTS

| Number | Country | Date |
|---|---|---|
| 432,727 | France | Oct. 11, 1911 |